(No Model.)
H. E. HARRINGTON.
PIPE OR FLUE CONNECTION FOR STEAM BOILERS.
No. 507,321. Patented Oct. 24, 1893.
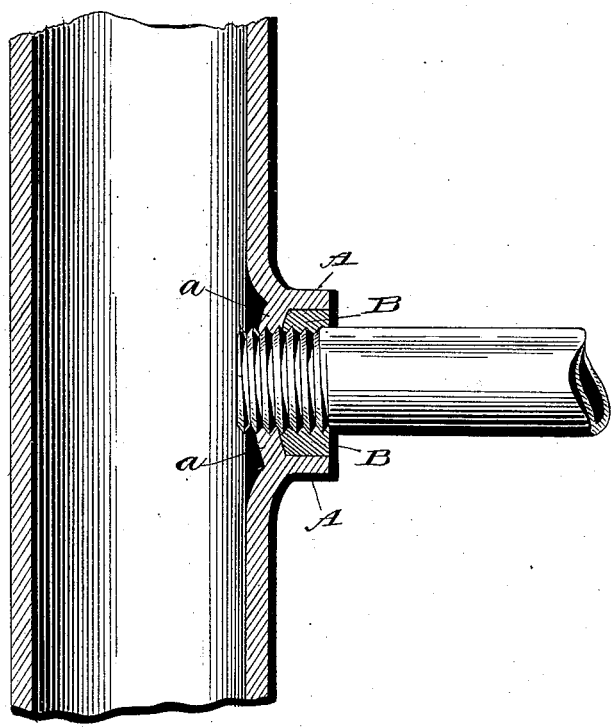
Witnesses:
L. C. Hills
A. L. Hough
Inventor:
Harry E. Harrington,
by Franklin H. Hough
Attorney.

UNITED STATES PATENT OFFICE.

HARRY E. HARRINGTON, OF OSKALOOSA, IOWA.

PIPE OR FLUE CONNECTION FOR STEAM-BOILERS.

SPECIFICATION forming part of Letters Patent No. 507,321, dated October 24, 1893.

Application filed April 27, 1893. Serial No. 472,077. (No model.)

*To all whom it may concern:*

Be it known that I, HARRY E. HARRINGTON, a citizen of the United States, residing at Oskaloosa, in the county of Mahaska and State of Iowa, have invented certain new and useful Improvements in Pipe or Flue Connections for Steam-Boilers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in pipe connections in steam heaters, pipe or flue boilers, and the like.

It has been found from experience in the use of steam heaters and pipe boilers, that the pipes will rust through at the ends, along that portion of the pipe which is provided with threads, within a much shorter period of time than is required in ordinary use, in rusting through the pipe at other points. This is due to the fact that in cutting the threads much of the metal of the pipe is cut away, thus rendering the pipe thinner at the threaded portions.

The object of the present invention is to provide means whereby the screw-threaded portions of the pipes within the boiler or heater heads will be effectually protected against the action of the water or dampness, sulphur, alkali or other substances which may come in contact with the pipes and tend to corrode the same.

To these ends and to such others as the invention may pertain, the same consists in the means for protecting the screw-threaded portions of the pipes, or the flanged portions of the same and to make a tight joint, as the case may be; all as hereinafter described, shown in the accompanying drawings and then specifically defined in the appended claim.

The invention is clearly illustrated in the accompanying drawing, which, with the letters of reference marked thereon, forms a part of this specification.

The drawing represents partly in section and partly in elevation, my improved means of attachment.

As is well known pipes or tubes which are used in connection with steam-heaters, boilers, &c., are provided at their ends, either with screw-threaded portions which extend for a considerable distance inward from the extreme ends of the pipe; this screw threaded portion being adapted to engage screw-threaded openings in the T or head through which the ends of the pipe are attached, or, they are provided with the usual flanged portions, which are employed where the screw threaded portion is omitted. Ordinarily a considerable portion of this screw-threaded portion of the pipe extends for a distance within the heater or boiler; and this threaded portion is exposed to the corroding action of the water contained in the boiler outside of the pipes or flues. To protect this threaded portion of the tubes, and to make also, an absolute tight joint is the object of the present invention, and it is accomplished in the manner illustrated in the drawing, in which I have shown the inner and outer face of the boiler head as provided with annular extensions A surrounding each of the screw-threaded openings in the head or T, for the reception of the pipes. These outward extensions, to a point beyond the threaded portion of the pipe, are filled with metal or other substance B which is adapted to the purpose, thus filling the threads of the pipe and serving to effectually protect the same, from the corroding influences surrounding the same, and to make an absolute tight joint, at the same time.

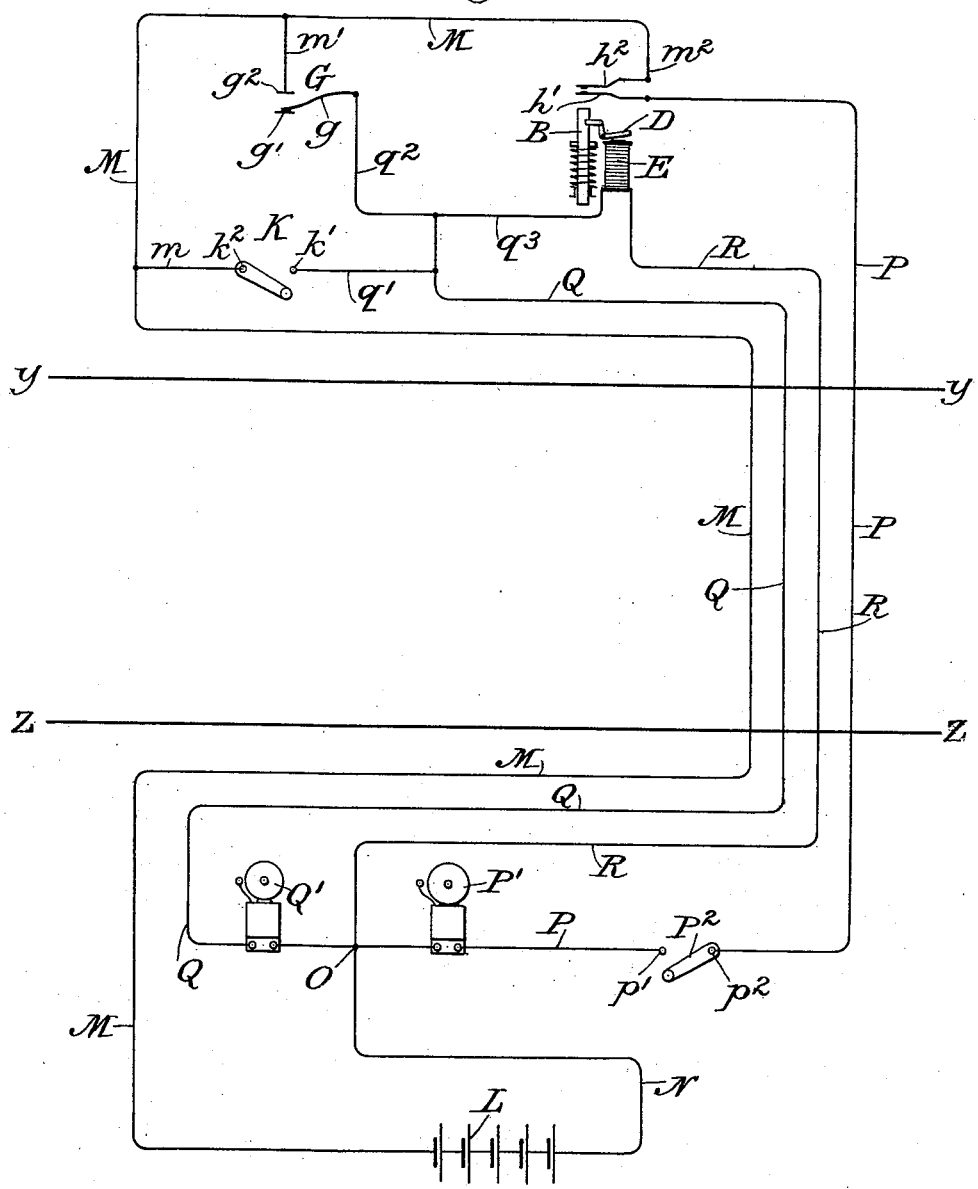

As seen in the drawing, the boiler head has an outward bulge *a* about the diaphragm in which the opening is formed to strengthen the head at this point.